United States Patent [19]

McOnie et al.

[11] 4,256,863

[45] Mar. 17, 1981

[54] VINYL HALIDE POLYMERIZATION PROCESS, REACTOR THEREFOR AND COATING PRODUCT FOR USE IN PROCESS AND WITH REACTOR

[75] Inventors: Malcolm P. McOnie, St. Albans; Philip D. Roberts, Harpenden, both of England

[73] Assignee: Imperial Chemical Industries Limited, London, England

[21] Appl. No.: 11,664

[22] Filed: Feb. 12, 1979

[30] Foreign Application Priority Data

Feb. 24, 1978 [GB] United Kingdom ............... 7462/78

[51] Int. Cl.³ ............................ C08F 2/00; C08F 2/20
[52] U.S. Cl. ................................. 526/62; 422/131; 427/409; 525/417
[58] Field of Search ...................... 526/62, 74

[56] References Cited

U.S. PATENT DOCUMENTS

| 3,669,946 | 6/1972 | Koyanagi | 526/62 |
|---|---|---|---|
| 3,778,423 | 12/1973 | Reiter | 526/62 |
| 3,849,179 | 11/1974 | Morningstar | 526/62 X |
| 4,024,301 | 5/1977 | Witenhafer | 427/230 |
| 4,024,330 | 5/1977 | Morningstar | 427/230 |
| 4,081,248 | 3/1978 | Cohen | 23/285 |
| 4,093,787 | 6/1978 | Burgess | 526/62 |
| 4,105,838 | 8/1978 | Kitamura | 526/62 |
| 4,105,839 | 8/1978 | Koyanagi | 526/62 |

FOREIGN PATENT DOCUMENTS

| 844215 | 11/1976 | Belgium | 526/62 |
|---|---|---|---|
| 844496 | 11/1976 | Belgium | 526/62 |
| 845168 | 12/1976 | Belgium | 526/62 |
| 849176 | 6/1977 | Belgium | 526/62 |
| 859630 | 4/1978 | Belgium | 526/62 |
| 2548424 | 5/1976 | Fed. Rep. of Germany | 526/62 |
| 1517734 | 7/1978 | United Kingdom | 526/62 |

*Primary Examiner*—C. A. Henderson
*Attorney, Agent, or Firm*—Cushman, Darby & Cushman

[57] ABSTRACT

Build-up during vinyl halide, particularly vinyl chloride, polymerization is prevented by employing a polymerization process using a reactor having an adherent internal coating of a coating product derived from the admixture of at least polyethyleneimine; one or more of hydroquinone, p-benzoquinone, catechol and o-benzoquinone; and at least one o-aldehyde-substituted phenol, particularly salicylaldehyde. The preferred system is prepared from polyethyleneimine, hydroquinone and salicylaldehyde.

7 Claims, No Drawings

VINYL HALIDE POLYMERIZATION PROCESS, REACTOR THEREFOR AND COATING PRODUCT FOR USE IN PROCESS AND WITH REACTOR

The present invention relates to a process for the polymerisation of vinyl halide monomers such as vinyl chloride in aqueous dispersion, to a reactor wherein such a polymerisation process may be carried out and to a certain product which may be used to coat the internal surfaces of such a reactor.

When vinyl halide monomers, particularly vinyl chloride, are polymerised in aqueous dispersion in a reactor it is well known that a problem arises in that surfaces inside the reactor become coated with tenaciously adhering polymeric material known as build-up. By polymerisation in aqueous dispersion is meant polymerisation in aqueous emulsion or aqueous suspension (including aqueous microsuspension). The formation of tenaciously adhering build-up is undesirable from the point of view of achieving efficient heat transfer for cooling and heating the reactor contents, effective usage of monomer, effective control and monitoring of the polymerisation reaction, and acceptable polymer quality (in view of contamination by dislodged particles of the build-up).

Because of the problems in respect of heat transfer, polymerisation control and polymer quality, it is necessary to clean the reactor between each polymerisation cycle wherein the deposited material is removed as completely as possible, e.g. by scraping or chipping by hand, solvent cleaning or pressure-washing. This is wasteful in terms of the expense of the equipment and manpower required to carry out such cleaning and also in terms of the loss of productivity for a given reactor arising from the time taken to effect the cleaning operation. Hand cleaning is additionally undesirable in that it may constitute a health hazard to the cleaner in view of the harmful properties of certain monomers, particularly vinyl chloride. Indeed, opening up the reactor between polymerisation cycles for cleaning is itself undesirable in this respect since it releases residual monomer in the reactor to the surrounding atmosphere.

It has been proposed in British Pat. No. 1,444,360 to coat the internal surfaces of a reactor used for vinyl chloride polymerisation with polyethyleneimine in order to prevent or reduce the formation of build-up therein. British Pat. No. 1,439,339 is directed towards the same object but employs, inter alia, polyethyleneimine which has been cross-linked with an aldehyde such as formaldehyde. We have found that these techniques, while effective, are not wholly satisfactory in plant-scale polymer production because there is still some build-up produced, particularly above the liquid level of the polymerisation medium, which necessitates fairly frequent cleaning of the reactor.

A technique has been proposed in the McOnie et al U.S. Pat. No. 4,181,787 which is a distinct improvement in terms of build-up prevention over those of British Pat. Nos. 1,444,360 and 1,439,339. In this, the internal surface(s) of the polymerisation reactor for the vinyl halide polymerisation is coated with an adherent coating of a product derived from the admixture of at least polyethyleneimine and one or more of hydroquinone, p-benzoquinone, catechol and o-benzoquinone and then the vinyl halide polymerisation is carried out in the reactor so coated. A particularly preferred coating product for use in this technique is one derived by admixing polyethyleneimine, hydroquinone and optionally a small quantity of pyrogallol.

The coating product in this technique is applied to the internal surfaces of the reactor as a dispersion or solution in a liquid carrier medium which must be allowed or caused, e.g. by heating and/or evacuating or blowing through air, to evaporate so as to leave an adherent coating.

We have found that in order to achieve adequate adhesion of the coating product in this technique, it is preferable to evaporate the liquid carrier medium by heating which is continued after evaporation is complete, i.e. to 'bake' the coating product onto the reactor surface. In any event, the necessary removal of all of the liquid carrier medium by evaporation, particularly by 'baking' to ensure improved adhesion, can be a time consuming operation especially where the reactor is very large—as is now the trend for PVC production to achieve economies of scale.

According to the present invention there is provided a process for the polymerisation of vinyl halide monomers in aqueous dispersion wherein polymerisation is carried out in a reactor having adherently deposited on internal surfaces thereof a coating of a product derived from the admixture of at least polyethyleneimine; one or more of hydroquinone, p-benzoquinone, catechol and o-benzoquinone; and at least one o-aldehyde-substituted phenol or the phenate derived therefrom.

There is also provided according to the invention a polymerisation reactor having internal surfaces which have been coated with a product derived from the admixture of at least polyethyleneimine; one or more of hydroquinone, p-benzoquinone, catechol and o-benzoquinone; and at least one o-aldehyde-substituted phenol or the phenate derived therefrom.

There is further provided according to the invention a coating product derived from the admixture of at least polyethyleneimine; one or more of hydroquinone, p-benzoquinone, catechol and o-benzoquinone; and at least one o-aldehyde-substituted phenol or the phenate derived therefrom.

For the sake of clarity, by an o-aldehyde-substituted phenol is meant a phenol (i.e. a mono- or polyhydroxyl nuclear substituted aromatic compound such as one based on a benzene ring) having an aldehyde group -CHO as a nuclear substituent ortho to a nuclear hydroxyl group.

Preferably the o-aldehyde-substituted phenol has the formula

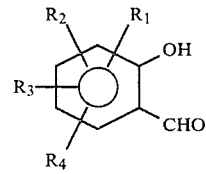

where $R_1$, $R_2$, $R_3$ and $R_4$, which may be the same or different are selected from H, halogen, hydroxyl, alkoxyl, aryl (including substituted aryl), alkyl (including substituted alkyl and preferably lower alkyl), alkenyl (including substituted alkenyl and preferably lower alkenyl), carboxyl, esterified carboxyl and acyl.

The inclusion of an o-aldehyde-substituted phenol (or phenate) as one of the constituents from which the coating product is derived results in the formation of a product having greatly enhanced adhesive properties.

Thus the product may be applied to the reactor internal surfaces as a dispersion or solution in a liquid carrier medium without there being any necessity to evaporate off the liquid carrier medium, e.g. by baking. All that is required e.g. is to allow the excess of the dispersion or solution to drain from the reactor followed if necessary by rinsing with water. Indeed baking is not to be recommended because it tends to inactivate the coating product of this invention for build-up prevention (and may also yield a thick coating which may subsequently flake off and contaminate the polymers), although evaporation without heating can still be used (providing the resulting coating is not too thick) if the time-saving advantage afforded by non-evaporation is not needed.

Thus the coating product of the invention, because of its improved adhesive properties, enables a time-saving to be achieved during a polymerisation cycle because an effective coating of it can be formed from an applied dispersion or solution without the necessity for evaporation, and particularly without the necessity for baking. At the same time its effectiveness as a build-up suppressant is by no means diminished in comparison to a coating product formed from the admixture of the same constituents with the exception of the o-aldehyde-substituted phenol. Indeed the coating product of the present invention is more effective in this respect in that a dispersion or solution of it can contain less than (usually about half) that in a dispersion or solution of the corresponding product formed without using the o-aldehyde-substituted phenol for the purpose of achieving equivalent build-up suppression (other things being equal).

The o-aldehyde-substituted phenol preferably has at least two of $R_1$, $R_2$, $R_3$ and $R_4$ as H. More preferably at least three of $R_1$, $R_2$, $R_3$ and $R_4$ are H, with the other substituents being e.g. alkyl (e.g. methyl), OH or H. Examples of suitable o-aldehyde-substituted phenols include salicyladehyde and gentisaldehyde. The most preferred o-aldehyde-substituted phenol is salicylaldehyde.

The preparation of the coating product may be undertaken under a variety of different conditions.

For example the preparation may be carried out under a wide range of temperature, varying from temperature preparations with temperatures of the order of 15°–100° C., to preparations at higher temperatures e.g. using temperatures of the order of 100°–150° C. and above. The usual range of preparation temperature is 15°–150° C., typical heat-treatment ranges being 15°–100° C. and 50°–150° C.

The preparation of the coating product is preferably effected in the presence of oxygen. This is conveniently supplied by exposing the constituents from which the product is derived to the surrounding air; such exposure may be during or after admixture. Oxygen may also be supplied by oxygen or air injection or from an added chemical which is a suitable oxidising agent; p-benzoquinone or o-benzoquinone themselves can sometimes serve as an oxidising agent.

The molar ratio of the polyethyleneimine repeat unit ($-CH_2CH_2NH-$) to the other component(s) (selected from one or more of hydroquinone, p-benzoquinone, catechol and o-benzoquinone and at least one o-aldehyde-substituted phenol as defined) is not critical although the polyethyleneimine (repeat unit) is preferably present in a molar excess over each of the other categories of constituent. For products derived from polyethyleneimine and hydroquinone the preferred molar ratio of polyethyleneimine (repeat unit)/hydroquinone is 6/0.5 to 1/1, typically 4/1 to 1/1 and particularly 2.5/1 to 1/1. The molar ratio of polyethyleneimine (repeat unit)/o-aldehyde-substituted phenol is preferably 6/1 to 1/1, more preferably 4/1 to 1/1, particularly 4/1 to 2/1.

The preparation of the coating product should preferably be undertaken under alkaline conditions, e.g. the medium in which the admixture takes place having pH>7. Under such circumstances, the o-aldehyde-substituted phenol is of course present as the phenate ion. To achieve this it is advantageous to employ an added inorganic alkali such as a metal or ammonium hydroxide (which may be added before, during or after admixture) to ensure an alkaline medium; preferably the inorganic alkali is a caustic alkali such as sodium hydroxide or potassium hydroxide.

In a preferred embodiment of the invention, the coating product is derived from the admixture of hydroquinone, polyethyleneimine, and salicylaldehyde, preferably under alkaline conditions (pH>7).

While it is possible to incorporate other oxygen-containing compounds into the mixture from which the coating product is derived, e.g. pyrogallol, this expedient is not preferred in the present invention.

The admixture of the constituents for the coating product may be effected on internal surfaces of the reactor, or in a separate operation away from the internal surfaces to form a product which is then applied to the internal surfaces. In both methods the coating product is applied to the surfaces as a dispersion or solution in a liquid carrier medium the excess of which may advantageously be allowed to drain from the reactor, the reactor surface preferably then being rinsed with e.g. water.

Where the admixture is effected on interior surfaces of the reactor, such admixture is preferably carried out at a low temperature, in the presence of oxygen or oxidising agent. This method of admixture is particularly applicable to the formation of a coating product derived from polyethyleneimine, hydroquinone and salicylaldehyde and may be conveniently effected by applying separate solutions or dispersions of the polyethyleneimine, hydroquinone, and salicylaldehyde sequentially or concurrently to the surface or surfaces to be coated (before adding the ingredients for the vinyl halide polymerisation reaction) whereupon interaction takes place rapidly to form a coating product carried in a liquid medium particularly when the constituents in the applied solutions or dispersions are exposed to the surrounding oxygen in the air.

Where admixture is effected in a separate operation before application of the coating product to an internal surface, a solution or dispersion of the product in a carrier medium is prepared and this solution or dispersion is applied to the reactor surface e.g. by spraying, painting, dipping or flooding. In this embodiment, the temperature during the admixing operation is not critical although a temperature of 50°–150° C. is preferred. The order in which the constituents are mixed and/or heat-treated in this embodiment is not critical. For example all of the constituents may be admixed and then heat-treated together. Alternatively e.g. the polyethyleneimine and the one or more of hydroquinone, p-benzoquinone, o-cathechol and o-benzoquinone may be admixed (such admixture sometimes advantageously being carried out in the presence of a small amount of an acid catalyst such as hydrochloric acid or aluminium chloride although the use of an acid catalyst is not essential), heat-treated, made alkaline and then the o-aldehyde-substituted phenol added to this mixture to form the coating product (with or without further heat-treatment).

In the case of admixing polyethyleneimine and hydroquinone in a separate premixing operation, these constituents are soluble in water, ethanol and methanol so that the mixing may be effected in water, water/ethanol or water/methanol as solvent, with the water, ethanol or methanol preferably being removed by distillation as part of the admixing operation to form the coating product. In such a case (e.g. using water/ethanol solvent), the reaction temperatures are conveniently the boiling points of water/ethanol and then water at atmospheric pressure; alternatively the admixture may be carried out under subatmospheric pressure so that lower admixing (and distillation) temperatures may be employed, e.g. temperatures of 50°–100° C. may be used, with the reduced pressure greatly facilitating the removal of ethanol and water. The o-aldehyde-substituted phenol (e.g. salicylaldehyde) may be incorporated with the polyethyleneimine and hydroquinone prior to distillation, both the distillation residue and phenol e.g. being dissolved in an alkali such as NaOH or KOH.

The product obtained from the premixing operation may vary from a very viscous substance to a glass-like substance and normally renders the medium in which the admixture takes place too viscous to be applicable directly to a reactor internal surface, even in cases where the medium has not been removed (e.g. by distillation). Consequently the product resulting from the admixture (whether still in the presence of the admixing medium or not) should normally be diluted with a solvent or dispersant which will then act as a liquid carrier medium for application to reactor internal surfaces. The coating products dissolve in very few liquids; however ethanol (and to a lesser extent methanol) has been found to be an adequate solvent. The coating products will also dissolve in aqueous alkaline solutions (of e.g. NaOH, KOH and Ca(OH)$_2$) which can therefore also be used as solvents. Solvent mixtures such as ethanol (or methanol) with aqueous alkali can also be used. A suitable non-solubilising dispersant is non-alkaline water, although care may sometimes be necessary to ensure that the product is evenly dispersed in the water.

In addition, it may be advantageous to incorporate a wetting agent into the solution or dispersion of the coating product which is applied to the reactor surfaces in order to ensure the best possible coverage thereof; this particularly applies where a reactor, e.g. a large plant-scale reactor made of steel, has surfaces that are rather rough or blemished from many years of operation.

The chemical nature of the coating product is by no means properly understood. However, since the product is invariably deeply coloured (e.g. red, brown, or black) it is believed that the product may at least to some extent include aminoquinonoid structures containing groups of the following type

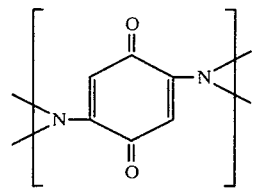

(and/or the corresponding ortho structures) with the nitrogen atoms being derived from the polyethyleneimine chain. It is thought that this type of structure may be rather more significant when admixture takes place at a low temperature.

It is also thought that the coating product consists at least to some extent of a condensation reaction product formed as a result of condensation between the amino groups of the polyethyleneimine and the hydroxy groups of e.g. the hydroquinone (and/or catechol).

It is further thought that the coating product consists at least to some extent of a stabilised form of the radical anion structurally derived from p-benzoquinone, i.e. the radical anion of the formula

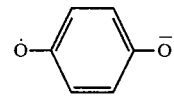

(and/or the corresponding radical structurally derived from o-benzoquinone) the stabilisation being effected by the dispersal of the radical anion in the polyethyleneimine matrix.

The effect of the o-aldehyde-substituted phenol is not properly understood but it is believed to react with the primary amino groups in the polyethyleneimine (which are present because of a certain amount of chain branching) to form Schiff's bases along the polymer chain which interact with the reactor surface, thereby enhancing the adhesion of the coating product to the reactor surface. Unlike the coating product of British Pat. No. 1 439 339, the coating product of the present invention is not cross-linked.

The amount of the coating product employed is not too critical (although the coating should not be too thick). Generally speaking, an amount of 1 to 100 ppm, preferably 2 to 25 ppm (by weight on the monomer to be charged), coated evenly over internal surfaces of the reactor is sufficient for many sizes and shapes of reactor. Of course, the surface area/volume ratio of reactors will vary considerably according to the sizes of the reactors. (Also it is to be appreciated that the amount of coating product actually applied may be greater than that finally remaining on the reactor surfaces due to losses incurred through e.g. draining and rinsing.)

The coating may be formed on any surface inside the reactor which is liable to suffer the formation of buildup thereon. For example, it may be applied to the interior surface of the main body of the reactor, and to the interior surface of the roof of the reactor which is often above the liquid level of the polymerisation medium and usually suffers tenacious build-up thereon. If a condenser is installed in a part of the reactor that is in contact with the gaseous phase during polymerisation or if it is installed outside the reactor and connected thereto by conduit piping, the condenser and conduit piping may be similarly coated. It is of course within the scope of the invention to selectively coat some internal surfaces of the reactor liable to build-up formation thereon while not coating others, although in practice this would only be of practical value for demonstration purposes, i.e. to show the difference between build-up formation between the coated and non-coated surfaces.

It is to be appreciated that for the best results, a surface to be coated should be as clean and as smooth as possible to begin with. If the surface is of somewhat dubious quality in this respect, it may be advisable to coat it with two or more successively applied layers of the coating.

Similarly if it is desired to carry out very many successive polymerisations in the same reactor (e.g. up to five or more) without opening or cleaning or recoating the reactor between polymerisations, it is preferable to use a multiple coating (e.g. three coatings) before starting the sequence of polymerisations.

The coating may be formed on a surface in combination with one or more other materials, e.g. materials which also have a suppressing effect on polymerisation buildup.

A reactor having coated internal surfaces according to the invention may be used for the polymerisation of vinyl halide monomers particularly vinyl chloride, wherein the formation of build-up is eliminated or very much suppressed. The polymerisation reaction may be carried out in the presence of a basic substance such as $NaHCO_3$ or a suitable buffering system to ensure an adequately high pH for the reaction medium (e.g. pH>4) as such an expedient can further enhance the build-up suppressant effect of the coating product.

By "vinyl halide monomers" is meant those monomers polymerisable by free-radical polymerisation which are olefinically unsaturated in the α-position and substituted by at least one halogen atom. These monomers are preferably selected from substituted derivatives of ethylene and contain only two carbon atoms. Examples of such monomers include vinyl chloride, vinyl bromide, vinyl fluoride, vinylidene chloride, vinylidene fluoride, chlorotrifluoroethylene and tetrafluoroethylene. The invention is preferably applied to the polymerisation of fluorine- or chlorine-containing vinyl monomers, especially vinyl chloride.

By "polymerisation" is meant both the homopolymerisation of the vinyl halide monomers and the copolymerisation with each other or with other comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefines such as ethylene and propylene, vinyl ethers and styrene compounds.

We prefer to apply the invention to the production of polymers containing at least 50% molar and more particularly at least 80% molar, of units derived from vinyl halide monomers, particularly vinyl chloride.

The present invention may be particularly employed in any polymerisation technique where a monomer(s) is dispersed in the form of droplets in a liquid aqueous phase. For example it may be used for polymerisation in aqueous emulsion in which case any suitable emulsifying agent can be used, and in particular an ionic emulsifying agent such as sodium lauryl sulphonate or sodium dodecyl benzene sulphonate, and non-ionic emulsifying agents. It is also possible to use any water-soluble free-radical polymerisation initiator and particularly a persulphate.

The invention is also very applicable to polymerisation in aqueous suspension and microsuspension.

Any suitable dispersing agent may be used for polymerisation in aqueous suspension, and particularly finely dispersed solids, gelatin, polyvinyl acetates of various degrees of hydrolysis, water-soluble cellulosic esters and polyvinyl pyrrolidones. These dispersing agents can be used together with other surface-active agents if desired. The amount employed may vary widely and is generally between 0.05 and 1.5% by weight calculated on the water used.

Any suitable free-radical polymerisation initiator that is monomer-soluble may be used for polymerisation in aqueous suspension. Examples of these include peroxy compounds such as di-tertiarybutyl peroxide, lauroyl peroxide and acetyl cyclohexyl sulphonyl peroxide, azo compounds such as azo-bis-isobutyronitrile and 2,2'-azo-bis-2,4-dimethylvaleronitrile and boron alkyls. Monomer-soluble free-radical polymerisation initiators that are particularly suitable for use in a polymerisation process according to the invention are the dialkyl peroxydicarbonates whose alkyl radicals contain up to 20 carbon atoms, such as diethyl peroxydicarbonate, diisopropyl peroxydicarbonate and dicetyl peroxydicarbonate, dicycloalkyl peroxydicarbonate such as bis(4-tertiary-butylcyclohexyl)peroxydicarbonate, and azo compounds such as 2,2'-azo-bis-2,4-dimethylvaleronitrile and azo-bis-isobutyronitrile. These initiators may be used in conventional quantities—generally speaking from 0.01 to 1% by weight calculated on monomer.

Polymerisation in homogenised aqueous dispersion, sometimes known as polymerisation in microsuspension, comprises mechanically homogenising an aqueous dispersion of the monomer or monomers in the presence of a surface-active agent (for example by subjecting it to a violent shearing action in a colloid mill), and polymerising the homogenised dispersion in the presence of an initiator that is monomer-soluble.

Conventional emulsifying agents and monomer-soluble initiators can be used for polymerisation in microsuspension such as for example a cationic emulsifying agent like sodium dodecylbenzene sulphonate, and peroxide initiators of the dialkanoyl peroxide type, e.g. lauroyl peroxide.

In addition to the emulsifying or dispersing agents and initiators, the aqueous dispersions (i.e. suspensions, microsuspensions and emulsions) may contain one or more additives that are sometimes employed in conventional processes for polymerisation in aqueous dispersion. Examples of such additives include particle size regulators, molecular weight regulators, stabilisers, plasticisers, colouring agents, reinforcing agents, and processing aids.

The operating conditions for polymerisation according to the present invention may be those customarily used. For example, in the case of vinyl chloride polymerisation, the polymerisation temperature is generally between 40° and 75° C. and the pressure generally below 15 kg/cm$^2$.

The present invention is now illustrated by the following Examples. Unless otherwise specified all parts and percentages are by weight.

EXAMPLE 1

A distillation apparatus based on a 5 liter capacity flanged flask and equipped with a polytetrafluoroethylene-coated stirrer, thermometer and air supply was assembled. It was charged with 440 g hydroquinone dissolved in a mixture of 750 ml water and 1000 ml ethanol. To this was added 1720 ml of a 20% aqueous solution of a commercially available polyethyleneimine and 40 ml concentrated HCl. The ratio of the reactants was therefore two repeat units —$CH_2CH_2NH$— of polyethyleneimine per mole of hydroquinone.

Air was bubbled continuously through the reaction mixture and ethanol followed by water was distilled off. (During the distillation some carry over occurred and the distillate became red-coloured.) When the distillation temperature reached 107.5° C., indicating that substantially all the solvent had been removed, heating was discontinued and, after removing the air supply, the contents of the flask were allowed to cool. A viscous, clear, deep red material remained. When cold it was dissolved in 1 N NaOH solution to produce a solution containing 10% of the product from distillation. This solution was stored in a polyethylene container.

A coating product according to the invention was prepared from a portion of the above solution. To an amount of 1 N NaOH solution equal in volume to this portion were added with stirring salicylaldehyde at a concentration of 80 ml (93.2 g) per litre of the above solution and 20% 'Triton' ×100 wetting agent at a concentration of 1 ml per litre of the above solution. After stirring for a further 10 minutes the portion of the above solution was added to the salicylaldehyde solution and the mixture stirred for a further 10 minutes.

The resulting solution of the coating product was stored in polyethylene containers (it was found that some skinning occurs on glass surfaces).

EXAMPLES 2 to 8

In these Examples, conventional vinyl chloride suspension homopolymerisations were carried out in a stainless steel reactor (capacity 5 liters) provided with a paddle stirrer. In Examples 2, 3, and 4 the interior surfaces of the reactor were thoroughly cleaned before polymerisation. The polymerisations were carried out at 57° C. using 100 parts vinyl chloride, 222 parts water, 0.22% of partially hydrolysed polyvinyl acetate (based on vinyl chloride charged) as suspending agent, and 0.08% of bis(4-tertiarybutylcyclohexyl)peroxydicarbonate as initiator (based on vinyl chloride charged). Polymerisation was continued until well into the pressure-drop region when the polymerisation was terminated by venting off the monomer. In Examples 3 and 4 the interior surfaces of the reactor were painted with a solution of the coating product from Example 1 containing 10 ppm of product (one painting in Example 3, three paintings in Example 4) (based on vinyl chloride charged), the reactor surfaces being rinsed with water after painting.

The polymerisations of Examples 4 to 8 were carried out successively in the reactor, and before the polymerisations of Examples 5 to 8, the pre-cleaning of the reactor body and roof was omitted. Moreover, in the polymerisations of Examples 4 to 7 the reactor was not opened up for examination after discharge of the polymer slurry but was used straightaway for the next polymerisation.

The observations of build-up formation in each case are shown in Table 1. It can be seen that the application of a coating product according to the invention had a pronounced suppressing effect on build-up. Moreover this suppression lasted over several polymerisations without the need to renew the coating or to effect inter-batch cleaning.

TABLE 1

| Ex. No. | Coating Product Applied (Source Ex. 1) and Amount | Build-up Observations Main body of reactor | Build-up Observations Roof of reactor |
|---|---|---|---|
| 2 | None | Chalky build-up on upper walls | Hard cake plus skin |
| 3 | 10 ppm, painted once | Clean | Clean |
| 4 | 10 ppm, painted thrice | Not examined | Not examined |
| 5 | None | Not examined | Not examined |
| 6 | None | Not examined | Not examined |
| 7 | None | Not examined | Not examined |
| 8 | None | Clean | Clean |

EXAMPLES 9 TO 14

In these Examples, conventional vinyl chloride suspension homopolymerisations in aqueous suspension were carried out in a stainless steel reactor (capacity 160 liters) provided with a paddle stirrer. Unless otherwise indicated the interior surfaces of the reactor were thoroughly cleaned before each polymerisation. The polymerisations were carried out at 57° C. using 100 parts vinyl chloride, 156 parts water, 0.13% partially hydrolysed polyvinyl acetate (based on vinyl chloride charged) as suspending agent and, as initiator, 0.078% bis(4-tertiarybutylcylohexyl)peroxydicarbonate in Examples 9 to 12 and 0.038% diethylperoxydicarbonate in Examples 13 and 14. The polymerisations were continued until well into the pressure-drop region when they were terminated by venting off the monomer. In Examples 10 and 14, the interior surfaces of the reactor were sprayed once with a solution of the coating product from Example 1 containing 10 ppm of product (based on vinyl chloride charged), the sprayed solution being allowed to drain off and the reactor being rinsed with water before charging the polymerisation ingredients.

The polymerisations of Examples 10 to 12 were carried out successively in the reactor, and before the polymerisations of Examples 11 and 12, the pre-cleaning of the reactor body and roof was omitted. Moreover in Examples 11 and 12, the coating was not renewed.

The observations of build-up formation in each case are given in Table 2. It can be seen that the application of a coating product according to the invention had a pronounced suppressing effect on build-up formation. Moreover, the suppressing effect lasts over several polymerisations.

TABLE 2

| Ex. No. | Coating Product Applied (Source Ex. 1) and Amount | Build-up Observations Main body of reactor | Build-up Observations Roof of reactor |
|---|---|---|---|
| 9 | None | Chalky build-up on upper walls | Hard cake plus skin |
| 10 | 10 ppm, sprayed once | Clean | Clean |
| 11 | None | Clean | Clean |
| 12 | None | Clean | Clean except for a trace of skin |
| 13 | None | Chalky build-up on upper | Hard cake plus skin |

TABLE 2-continued

| Ex. No. | Coating Product Applied (Source Ex. 1) and Amount | Build-up Observations | |
|---|---|---|---|
| | | Main body of reactor | Roof of reactor |
| 14 | 10 ppm, sprayed once | walls Clean | Clean |

EXAMPLE 15

A mixture of polyethyleneimine (129 ml of a 20% aqueous solution), hydroquinone (16.5 g), pyrogallol (1.65 g) and conc. HCl (3.75 ml) was prepared, the mixture corresponding to a molar ratio of 4 (polyethyleneimine repeat unit)/1 (hydroquinone)/0.1 (pyrogallol). The mixture was heated to reflux temperature (100° C.) and water was distilled from the mixture until most of it had been removed. Small quantities of the starting materials were removed in the distillate. The residual water was removed with nitrogen. The product was a brown-black viscous material which was soluble in ethanol.

EXAMPLES 16 TO 19

In these Examples, the polymerisation procedure of Examples 2 to 8 was adopted. In each Example, the interior surfaces of the reactor were painted with ethanol containing 50 ppm of the coating product of Example 15 (based on vinyl chloride charged), the coatings being allowed to dry (no rinsing).

The polymerisations of Examples 16 to 19 were carried out successively in the reactor, and before the polymerisations of Examples 17, 18 and 19 the pre-cleaning of the reactor body and roof was omitted (the reactor body and roof were cleaned before starting the polymerisation of Example 16).

The observations of build-up formation in each case are shown in Table 3.

TABLE 3

| Ex. No. | Coating Product Applied (Source Ex. 15) and Amount | Build-up Observations | |
|---|---|---|---|
| | | Main body of reactor | Roof of reactor |
| 16 | 50 ppm, painted once | Clean | Clean |
| 17 | 50 ppm, painted once | Clean | Clean |
| 18 | 50 ppm, painted once | Some patches of light skin | Some flaky cake (easily removed by washing) |
| 19 | 50 ppm, painted once | Thick skin | Thick skin |

It can be seen that the application of the coating product of Example 15, not according to the invention (formed from a mixture lacking o-aldehyde-substituted phenol), while undoubtedly effective in suppressing build-up, is nevertheless not as effective as the coating product of the present invention. This is particularly noticeable by comparing Examples 16 to 19 with Examples 4 to 8 (both show polymerisation sequences without interbatch cleaning using the same polymerisation conditions). The coating product used in Examples 4 to 8 is clearly more effective particularly in view of the fact that the coating product is not renewed after the first polymerisation (as it is in each polymerisation in Examples 16 to 19) and that it is applied in smaller amount.

EXAMPLES 20 TO 32

In these Examples, the technique of the present invention was investigated as a Plant Trial for a series of conventional vinyl chloride suspension homopolymerisations (Examples 20 to 32) using a plant-scale stainless steel reactor provided with a paddle stirrer. The polymerisations were carried out at 57° C. using 100 parts vinyl chloride, 145 parts water, 0.13% (in Examples 20 to 23) and 0.12% (in Examples 24 to 32) of partially hydrolysed polyvinyl acetate (based on vinyl chloride charged) as suspension agent and 0.059% of bis(4-tertiarybutylcyclohexyl)peroxydicarbonate as initiator (based on vinyl chloride charged). Polymerisation was continued in each case until well into the pressure-drop region and terminated by venting off the monomer.

The coating product used was applied before each polymerisation and applied as a solution (employing a single spraying) prepared as described in Example 1 (amount of coating product in solution as indicated in Table 4). Before the polymerisation of Example 20, the interior of the reactor (main body and roof) was cleaned; however in all the other polymerisations, pre-cleaning was omitted.

The observations of build-up formation are shown in Table 4.

TABLE 4

| Ex. No. | Amount Coating Product Applied (Source Ex. 1) | Build-up Observations (Main body and roof of reactor) |
|---|---|---|
| 20 | 20 ppm | Clean |
| 21 | 10 ppm | Clean |
| 22 | 10 ppm | Clean |
| 23 | 10 ppm | Clean |
| 24 | 10 ppm | Clean |
| 25 | 5 ppm | Clean |
| 26 | 5 ppm | Clean |
| 27 | 5 ppm | Clean |
| 28 | 5 ppm | Clean |
| 29 | 5 ppm | Clean |
| 30 | 10 ppm | Clean |
| 31 | 10 ppm | Clean |
| 32 | 20 ppm | Clean |

EXAMPLE 33

In this Example, conventional vinyl chloride suspension polymerisations were again carried out in a plant-scale stainless steel reactor, except that the capacity of this reactor was very much greater than that employed in Examples 20 to 32. As such, it was not possible, with the spraying equipment available at the time, to properly spray all the interior of the reactor with coating product of the invention. However, unlike the reactors used in the preceding Examples, this reactor was provided on its roof with a chimney-shaped extension for receiving inlet piping, the chimney being closed off with a bursting disc. It was to the interior surfaces of this chimney and bursting disc, which during polymerisation always become heavily encrusted with build-up, that the coating product was applied (the remainder of the reactor interior not being coated).

The polymerisations (61 in all) were carried out at 57° C. using 100 parts vinyl chloride, 119 parts water, 0.096% or 0.088% of partially hydrolysed polyvinyl acetate (based on vinyl chloride charged) as suspension agent, and 0.036% of diethyl peroxydicarbonate (based on vinyl chloride charged). Polymerisation was continued in each case until well into the pressure-drop region and terminated by venting off the monomer.

Before each polymerisation, the main body and roof of the reactor were cleaned to remove the build-up which was always formed. Before the first polymerisation the chimney and bursting disc interior surfaces were sprayed with the coating solution of Example 1 containing 0.87 ppm of coating product (one spraying; no rinsing). In the next three polymerisations the chimney and bursting disc interiors were sprayed (before the start of the polymerisations) with the coating solution of Example 1 containing 0.58 ppm of coating product in each case (one spraying; no rinsing). In each of these four polymerisations, there was no build-up formed on the interior surface of the chimney or on the interior surface of the bursting disc (and consequently no cleaning was required). A further 57 polymerisations were then carried out successively in the reactor without any further treatment of the chimney and bursting disc interiors with the coating product. In each of the polymerisations no build-up was observed inside the chimney or on the bursting disc (and consequently no cleaning was required).

EXAMPLE 34

17.5 liters water were added to a stirred 50 liter capacity flask fitted with a mushroom valve and heated to 75° C. The following were then charged: hydroquinone (4.4 kg), salicylaldehyde (2.64 kg), polyethyleneimine (17.2 liters of a 20% aqueous solution), and concentrated HCl (400 ml), these components being flushed in with a further 10 liters of water. The flask was heated from 55° C. to reflux over 1.5 hours. Air was passed in at 1 liter/hour for 1 hour after which the air and heat were turned off. The reaction mixture was then dissolved in a separate flask in a total of 150 liters 1 N NaOH solution, adding the mixture gradually to the alkali. After filtration (to remove a few grams of insoluble material), 200 ml of a 20% solution of wetting agent (nonyl phenol/polyethylene oxide condensate) were added to the 200 ml dark brown solution. The solution was allowed to age several days and then diluted 1:1 with water before use.

EXAMPLE 35

A conventional vinyl chloride suspension polymerisation was carried out in a stainless steel reactor (capacity 160 liters) provided with a paddle stirrer using the polymerisation recipe of Examples 13 and 14. Before the start of the polymerisation the internal surfaces of the reactor were sprayed with the solution from Example 34 containing 27.5 ppm of the coating product according to the invention. At the end of the polymerisation the internal surfaces of the reactor were found to be entirely free from build-up.

EXAMPLE 36

The polymerisation of Example 35 (using cleaned interior surfaces) was repeated except that the reactor was not sprayed with the coating product from Example 34. At the end of the polymerisation, the interior surfaces of the reactor were encrusted with a skin of build-up.

We claim:

1. In a process for the polymerisation of vinyl chloride in aqueous dispersion wherein polymerisation is carried out in a reactor having adherently deposited on internal surfaces thereof a coating of a reaction product comprising the reactive admixture of a least polyethyleneimine and one or more of hydroquinone, p-benzoquinone, catechol and o-benzoquinone, the improvement wherein at least one o-aldehyde-substituted phenol of formula

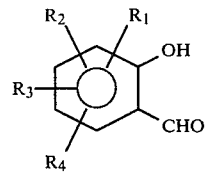

where $R_1$, $R_2$, $R_3$ and $R_4$ which may be the same or different are selected from H, halogen, hydroxyl, alkoxyl, unsubstituted aryl, unsubstituted alkyl, unsubstituted alkenyl, carboxyl, esterified carboxyl and acyl, or the phenate derived therefrom, is included in the reactive admixture to form said product.

2. A process according to claim 1 wherein the o-aldehyde-substituted phenol used in the preparation of coating product used in the process is salicylaldehyde.

3. A process according to claim 1 wherein the coating product used in the process is derived from the admixture of polyethyleneimine, hydroquinone and at least one o-aldehyde-substituted phenol.

4. A process according to claim 1 wherein the preparation of the coating product used in the process is carried out under alkaline conditions (pH > 7).

5. A process according to claim 1 wherein the preparation of the coating product used in the process is carried out in the presence of oxygen or an oxidising agent.

6. A process according to claim 1 wherein the preparation of the coating product used in the process is carried out using a molar ratio of polyethyleneimine/o-aldehyde-substituted phenol of 6/1 to 1/1.

7. A process according to claim 3 wherein the preparation of the coating product used in the process is carried out using a molar ratio of polyethyleneimine/hydroquinone of 6/0.5 to 1/1.

* * * * *